United States Patent
Gupta

(10) Patent No.: US 8,947,360 B2
(45) Date of Patent: Feb. 3, 2015

(54) SET OF HANDHELD ADJUSTABLE PANELS OF ERGONOMIC KEYS AND MOUSE

(76) Inventor: Vivek Gupta, Kingston (CA)

(*) Notice: Subject to any disclaimer, the term of this patent is extended or adjusted under 35 U.S.C. 154(b) by 515 days.

(21) Appl. No.: 12/853,102

(22) Filed: Aug. 9, 2010

(65) Prior Publication Data

US 2011/0050584 A1  Mar. 3, 2011

Related U.S. Application Data

(60) Provisional application No. 61/272,023, filed on Aug. 7, 2009.

(51) Int. Cl.
*G06F 3/02* (2006.01)
*G09G 5/00* (2006.01)

(52) U.S. Cl.
CPC .............. *G06F 3/021* (2013.01); *G06F 3/0216* (2013.01); *G06F 3/0219* (2013.01)
USPC ............................. 345/169; 345/156; 345/168

(58) Field of Classification Search
USPC .................. 345/8, 168, 169, 175; 361/679.01
See application file for complete search history.

(56) References Cited

U.S. PATENT DOCUMENTS

| | | |
|---|---|---|
| 1,336,151 A | 4/1920 | O'Connor |
| 3,022,878 A | 2/1962 | Seibel et al. |
| 4,517,424 A | 5/1985 | Kroczynski |
| 4,905,001 A | 2/1990 | Penner |
| 5,481,263 A | 1/1996 | Choi |
| 5,503,040 A | 4/1996 | Wright |
| 5,552,782 A | 9/1996 | Horn |
| 5,743,666 A | 4/1998 | VanZeeland et al. |
| 5,764,164 A | 6/1998 | Cartabiano et al. |
| 5,781,127 A | 7/1998 | Kleve |
| 5,796,354 A | 8/1998 | Cartabiano et al. |
| 6,097,374 A | 8/2000 | Howard |
| 6,184,804 B1* | 2/2001 | Harrison ..................... 341/22 |
| 6,429,854 B1 | 8/2002 | McKown |
| 6,630,924 B1 | 10/2003 | Peck |
| 6,670,894 B2 | 12/2003 | Mehring |
| 6,707,447 B1 | 3/2004 | Goranowski |
| 6,765,502 B2 | 7/2004 | Boldy et al. |
| 6,817,641 B1* | 11/2004 | Singleton, Jr. ............. 294/106 |
| 6,885,316 B2 | 4/2005 | Mehring |
| 6,970,157 B2 | 11/2005 | Siddeeq |
| 7,138,976 B1* | 11/2006 | Bouzit et al. ................ 345/156 |
| 7,273,324 B2 | 9/2007 | Mercier |
| 2001/0045939 A1* | 11/2001 | Myerson et al. ............ 345/156 |
| 2002/0118175 A1* | 8/2002 | Liebenow et al. .......... 345/168 |

(Continued)

FOREIGN PATENT DOCUMENTS

| | | |
|---|---|---|
| GB | 2076743 | 12/1981 |
| JP | 4324516 | 11/1992 |

*Primary Examiner* — Gerald Johnson

(57) ABSTRACT

A set of handheld, adjustable panels including a plurality of ergonomic keys which function as a keyboard and mouse to allow a user to easily input data to an electronic device. The handheld keyboard and mouse includes two handheld components. Each component comprises a base that fits into the user's palm, a plurality of adjustable finger panels, and an adjustable thumb portion adjacent to the finger panels. The finger panels include a plurality of keys so as to function as a keyboard, and the thumb portion also includes a plurality of keys and acts like a mouse. Each component may also include clips or straps for securing the component to the user's hand, as well as a stand for supporting the component when it is not in use. In addition, at least one of the components may include a display means.

20 Claims, 18 Drawing Sheets

(56) References Cited

U.S. PATENT DOCUMENTS

| | | |
|---|---|---|
| 2005/0052291 A1 | 3/2005 | Backman et al. |
| 2005/0156895 A1 | 7/2005 | Ho |
| 2006/0171758 A1 | 8/2006 | Kleve |
| 2007/0075966 A1* | 4/2007 | Daniel .................... 345/156 |
| 2008/0048985 A1* | 2/2008 | Kawami et al. ........... 345/168 |
| 2008/0180654 A1* | 7/2008 | Bathiche et al. ............ 356/51 |

* cited by examiner

FIG. 1A  FIG. 1B

SET OF HANDHELD ADJUSTABLE PANELS OF ERGONOMIC KEYS AND MOUSE

FIELD OF THE INVENTION

The present invention is generally directed to a handheld, adjustable, and ergonomic device for inputting data to an electronic device, such as a computer. In a preferred embodiment, the invention involves a handheld set of adjustable and ergonomic panels having plurality of keys that provide the functions of a keyboard and mouse. The invention can also include a display means, such as a monitor.

BACKGROUND

In the present electronic era, computerized devices, such as a personal computers, cellular telephones, calculators, gaming systems, and personal digital assistants (PDAs), are ubiquitous in society. Two of the most common means of entering data into these devices are keyboards and pointing devices commonly referred to as "mice." Keyboards and mice translate a user's hand motions into electronic signals that are readable by computerized devices.

Conventional keyboards include a plurality of keys extending across a generally flat and slightly elevated surface, and the keys are typically marked with a respective character or characters. To use such a conventional keyboard, a user places his or her hands on top of the keys and presses downwardly to select a key. While these keyboards are an effective means of data input, the extended and elevated position of the user's hands requires the user to lock his or her hands and arms in three distinct positions, namely pronation, ulnar deviation, and extension, simultaneously while typing. Since conventional keyboards cause a user's arms and hands to be continuously locked in these three positions during the entire duration of use, conventional keyboards are not ergonomically effective.

A traditional mouse includes a limited number of keys and is designed to be grasped by a user's hand. The mouse transmits key strokes to a computing device in one of two ways. In a first type of conventional mouse, the mouse relays the movements of the mouse itself to the computing device. A second type of mouse includes a trackball, which a user typically operates with his or her thumb. This type of mouse then relays the movements of the trackball to a computing device. While either type of conventional mouse is moveable and much smaller than a conventional keyboard, such a mouse also results in a user's hand being in an elevated and extended position.

To mitigate against the health concerns, there have been many keyboard and mouse designs. For example, some keyboards include a curved upper surface, while other keyboards include wrist supports. Recently, wearable keyboards have been developed to eliminate the strain on a user's wrists and forearms. Wearable keyboards are typically secured to a user's hands, arms, or body, via straps or clips. Consequently, these wearable keyboards require significant effort, and even assistance, to put on and take off. Despite the design efforts, there still remains a need for an ergonomic input device that allows a user to quickly and effectively enter data into a computerized device.

SUMMARY

The present invention is a set of handheld, adjustable panels including a plurality of ergonomic keys which function as a keyboard and mouse to allow a user to easily input data to an electronic device while sitting, standing, or walking. Similarly, the set of handheld adjustable panels allows a user to input data while moving or resting his or her hands, arms, and fingers in a manner most natural and comfortable to the user. As a result, the present invention provides a user with an ergonomic and user-friendly means of entering data to a computerized device without any undue stress and strain on the user's fingers, hands, arms, and body.

The handheld keyboard and mouse of the present invention includes two components: one designed to fit a user's right hand, and the other designed to fit the left hand. Each component comprises a base portion that fits into the user's palm, a plurality of adjustable finger panels extending from the base, and an adjustable thumb portion similarly extending from the base and adjacent to the finger panels. The finger panels include a plurality of keys so as to function as a keyboard, and the thumb portion also includes a plurality of keys and acts like a mouse. Each component may also include clips or straps for securing the component to the user's hand, as well as a stand for supporting the handheld component when it is not in use. In addition, at least one of the components may include a display means, such as a monitor. The display means can display the characters associated with each key on the finger and thumb panels or show other data, such as the information inputted by a user via the keys. Further, the display means may include the functions of a handheld device, such as an iPhone® or Blackberry®, namely displaying websites and other computer applications. The display means can also function as a phone or as a gaming console which transmits movements of a user's hands, fingers, and thumbs to a computing device.

BRIEF DESCRIPTION OF THE DRAWINGS

A better understanding of the invention will be had with reference to the attached drawings wherein:

FIG. 1A is a top view of a base portion of a left hand component of the set of handheld, adjustable panels having a plurality of ergonomic keys that function as a keyboard and mouse of the present invention;

FIG. 1B is a top view of a base portion of a right hand component;

DETAILED DESCRIPTION OF THE DRAWINGS

Figure 1C:
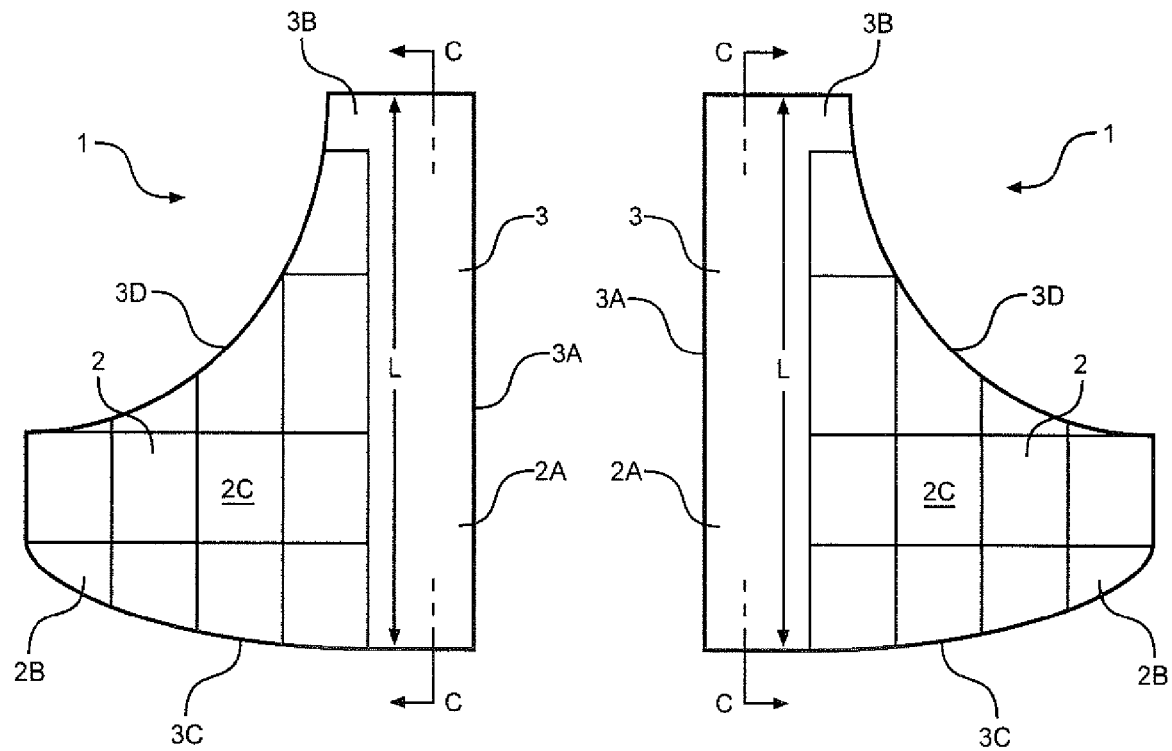
FIG. 1C is a cross-sectional view of each of the base portions shown in FIGS. 1A and 1B view taken along line C-C.
Figure 1C:
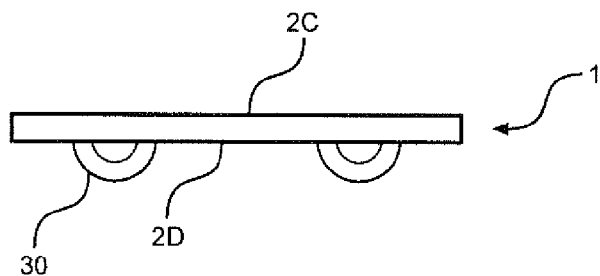

The set of handheld, adjustable panels having a plurality of ergonomic keys that function as a keyboard and a mouse of the present invention includes two handheld components 1, namely a left hand component and a right hand component, that are designed to fit into a user's left and right hands, respectively. Each component 1 comprises a generally planar base 2 that is preferably made at least partially from a magnetic material and is shaped to be comfortably received into a user's hand. Each planar base 2 preferably includes a material portion 2a providing a continuous surface and a grid or mesh portion 2b. The grid portion 2b may include a plurality of perpendicularly extending ribs or be made from a mesh or other porous material to provide adequate ventilation when the user clutches the components 1 in his or her hands.

As shown in FIGS. 1A, 1B, and 1C, the base 2 has an upper surface 2c and a lower surface 2d. Each base 2 also has a substantially rectangular shaped area 3, including a longitudinal axis L, a first side 3a parallel to the longitudinal axis L, opposing sides 3b and 3c that are adjacent the first side 3a and generally perpendicular to the longitudinal axis L, and a curved edge 3d that is adjacent the opposing side 3b and substantially opposite the first side 3a. When placed in a user's palm, the lower surface 2d of the base 2 is adjacent the palm, and the rectangular area 3 fits in the upper portion of the user's palm so that the first edge 3a is just below the base of the fingers. One opposing side 3b is near an index finger, while the other opposing side 3c is adjacent a pinky finger. Further, the curved edge 3d fits the contour of the user's hand adjacent a thumb. As a result of the size and shape of the base portion 2, a user can comfortably move his or her fingers and thumb while the base 2 is in the palm.

Figure 2:
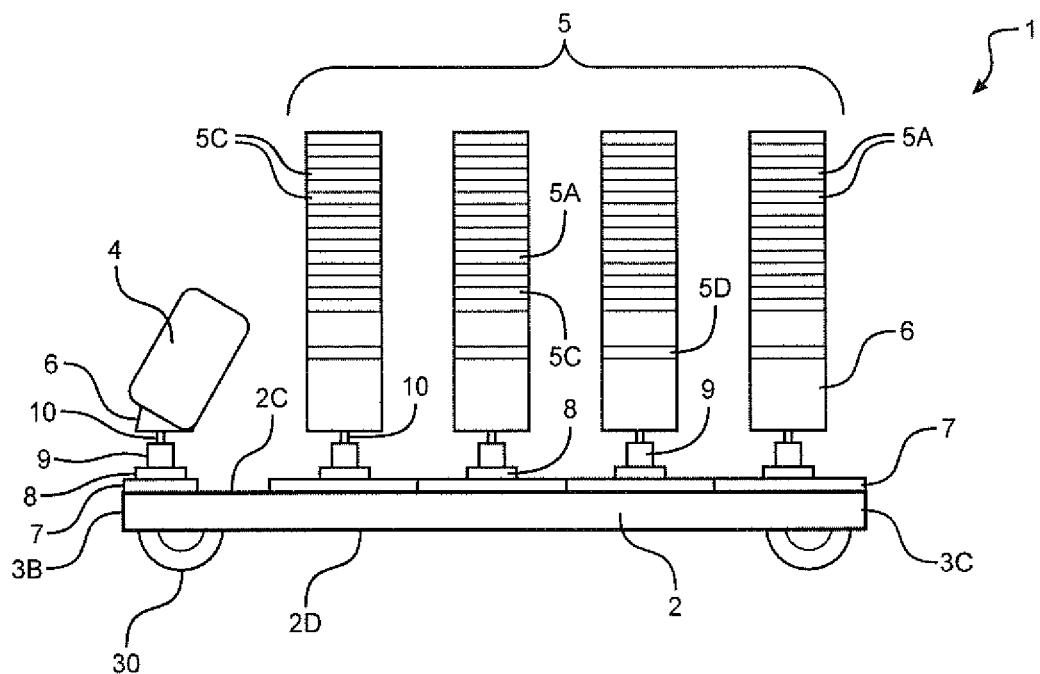
FIG. 2 is a front view of a right hand component wherein the finger panels are equally spaced.

In addition to a base 2, each of the left and right hand components 1 includes a thumb panel 4 attached to the material portion 2a of the upper surface 2c and located along the opposing side 3b and a plurality of finger panels 5 also attached to material portion 2a of the upper surface 2c and located along the first side 3a of the rectangular area 3, as shown in FIG. 2. The thumb panel 4 and the finger panels 5 generally extend perpendicularly from the upper surface 2c of the base 2. Each component 1 preferably includes one thumb panel 4 and four evenly-spaced finger panels 5. However, any number of thumb panels 4 and finger panels 5 can be mounted to the component 1.

Figure 2A:
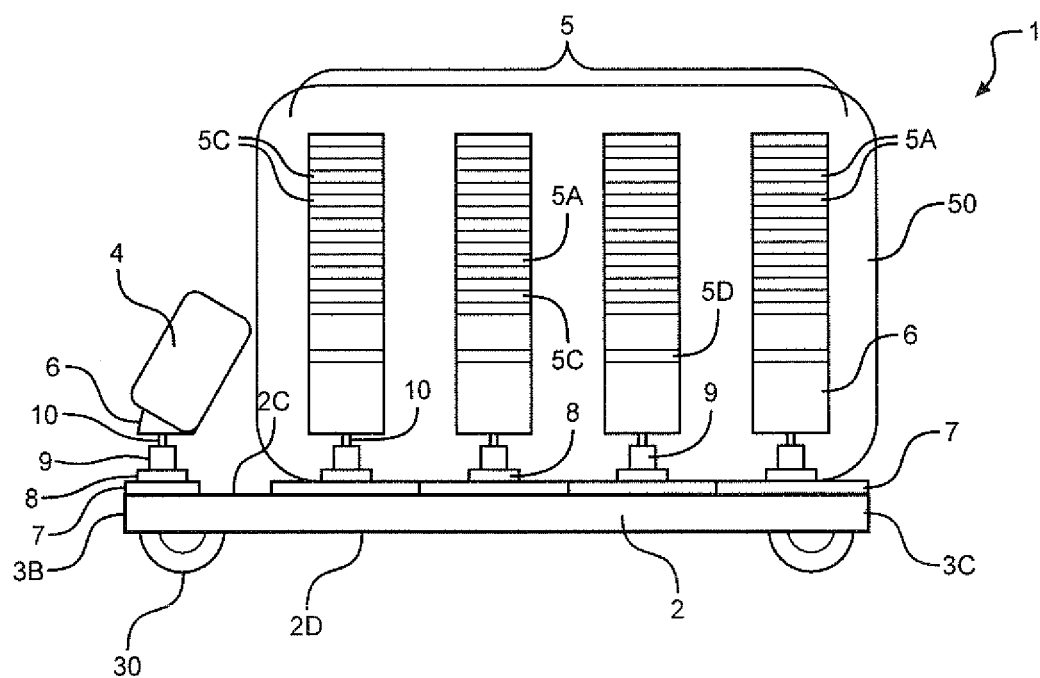
FIG. 2A is a front view of a right hand component having a display means wherein the finger panels are equally spaced.

In addition to the thumb panel 4 and the finger panels 5, at least one of the left and right components 1 includes a display means 50, as shown in FIG. 2A. In a preferred embodiment, the display means 50 is a monitor; however, a component 1 may include any suitable display means. The display means 50 includes a front surface 50a for displaying information and an opposing rear surface 50b. The display means 50 is attached to the upper surface 2c of the base 2 and is located adjacent to the finger panels 5. Further, the display means 50 is positioned relative to the finger panels 5 such that the front surface 50a faces the user when the user holds the component in the user's hands and the user's fingers engage the finger panels 5. Consequently, the position of the display means 50 allows a user to see the information displayed on the front surface 50a while imputing data via the thumb panel 4 and the finger panels 5 of the component 1.

Figure 3A:
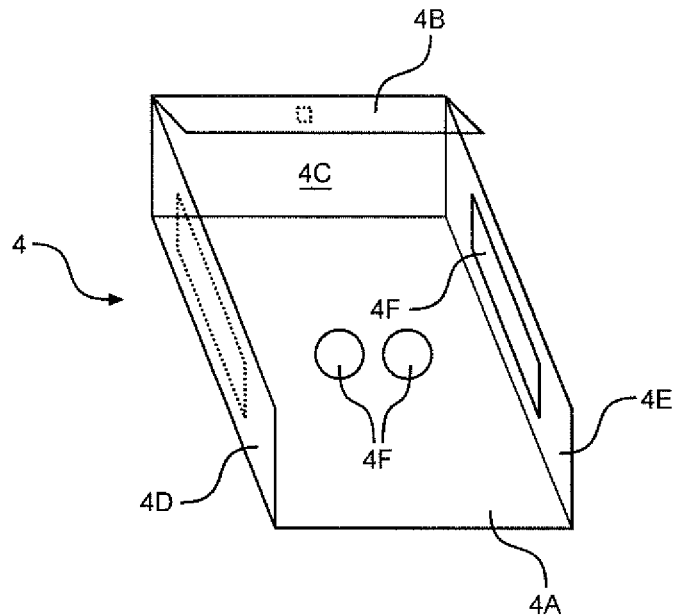
FIG. 3A is a perspective view of a thumb panel of a left hand component.
Figure 3B:
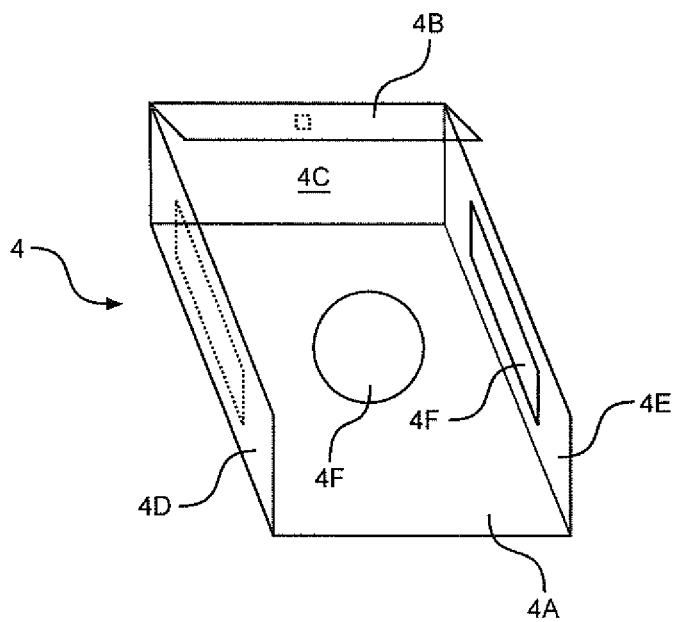
FIG. 3B is a perspective view of a thumb panel of a right hand component.

The thumb panel 4 of each left and right hand component 1 preferably has a generally rectangular box-like shape that is open on at least one side for receiving a user's thumb therein. As shown in FIGS. 3A and 3B, the thumb panel 4 includes a lower base wall 4a and an opposing canopy 4b that only partially covers the base wall 4a. Between the base wall 4a and canopy 4b, the thumb panel 4 includes a front wall 4c and opposing left and right side walls 4d and 4e, respectively. The base wall 4a, canopy 4b, front wall 4c, left side wall 4d, and right side wall 4e each includes one or more keys 4f. The keys 4f are programmed to perform various functions so that the thumb portion 4 can act as a mouse, preferably a trackball mouse, as well as perform certain functions associated with a conventional keyboard.

When a user grasps a component 1, the user's thumb is received in the thumb panel 4 within a space between the left side wall 4d and the right side wall 4e at an end opposite the front wall 4c so that the user's thumb rests on the lower base wall 4a underneath the canopy 4b. In this position, the user's thumb can easily access the keys 4f on the lower base wall 4a, canopy 4b, front wall 4c, and left and right side walls 4d and 4e, respectively.

Figure 4:
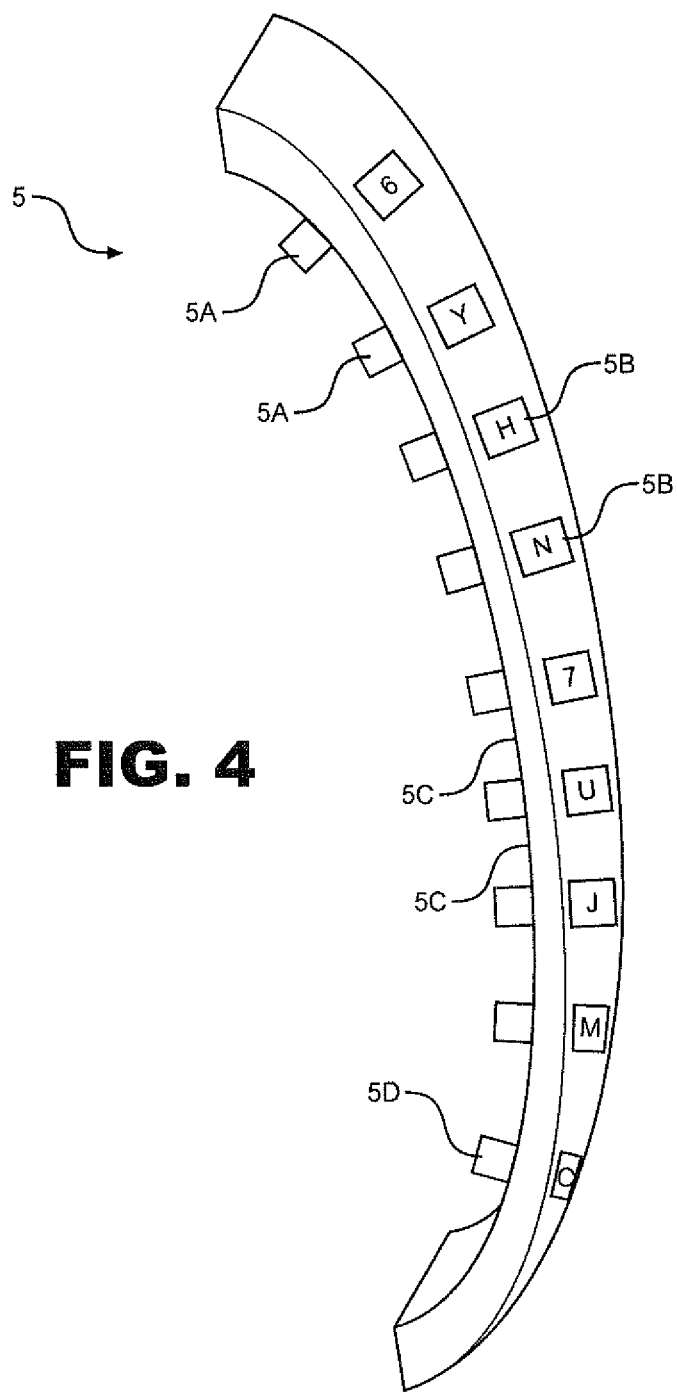
FIG. 4 is a perspective view of a finger panel.
Figure 16:
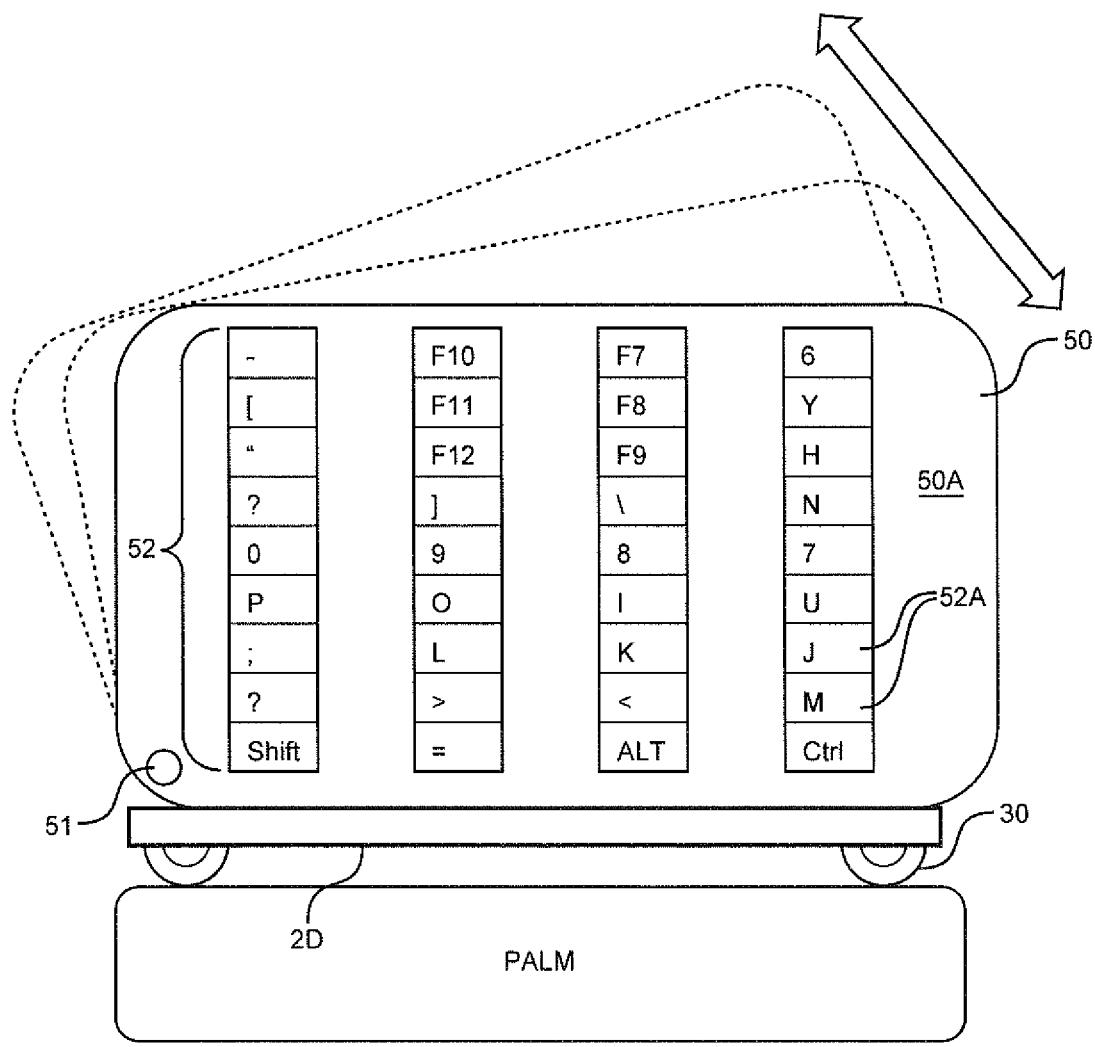
FIG. 16 is a planar view if the front surface of the display means of a component showing an ability of the display means to move relative to an upper surface of the component base.

Each finger panel 5 is preferably an elongated, curved panel to securely receive a user's finger, but each finger panel 5 may also be a generally flat panel. The finger panels 5 each have a plurality of keys 5a along the length of the panel 5 that are programmed to perform various functions. The keys 5a are positioned on a side of the panel 5 so that the keys 5a are adjacent a user's finger when the user grasps a component 1. Each finger panel 5 may also includes labels 5b for the keys 5a, and the labels 5b are located on a side of the panel 5 that is visible to the user when he or she holds the component 1, as shown in FIG. 4. Alternatively, the component 1 may include a display means 50 which displays information for each key 5a, as shown in FIG. 16. Further, the keys 5a are generally evenly spaced apart, with spaces 5c between the keys 5a, and a bottom key 5d is located closest to the base 2 and spaced from the remaining keys 5a. However, any suitable spacing and arrangement of keys 5a may be used.

To translate a user's hand motions to electronic signals, the keys 4f of the thumb panel 4 and the keys 5a of each finger panel 5 each includes a lever or dome on the underside thereof. When the user depresses a key, the lever or dome hits a conductive contact to complete a circuit. A processor then receives the electrical signal indicative of what key was pressed. Alternatively, the keys may be part of an optical system wherein when a user depresses a key, the lever or dome on the underside of the key interrupts a beam of light. A sensor detects the interruption and sends an electrical signal to processor indicative of what key was pressed. Further, any other suitable keyboarding system may be used. Further, the electronic signals generated by the keys 4f of the thumb panel 4 and the keys 5a the finger panels 5 may be transmitted to a computing device via wires or wirelessly, such as by Bluetooth® technology.

Figure 5:
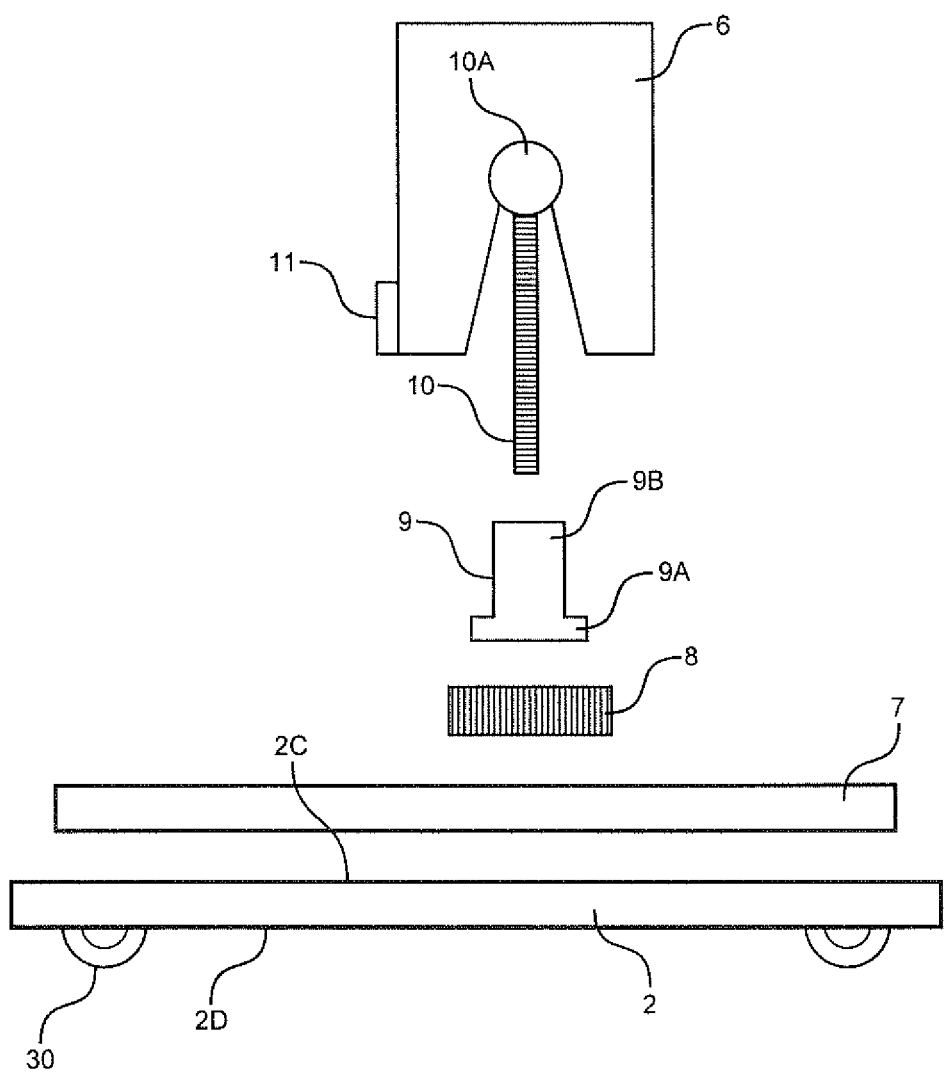
FIG. 5 is an exploded view of a mounting assembly of a finger panel to a base portion of a component.
Figure 6:
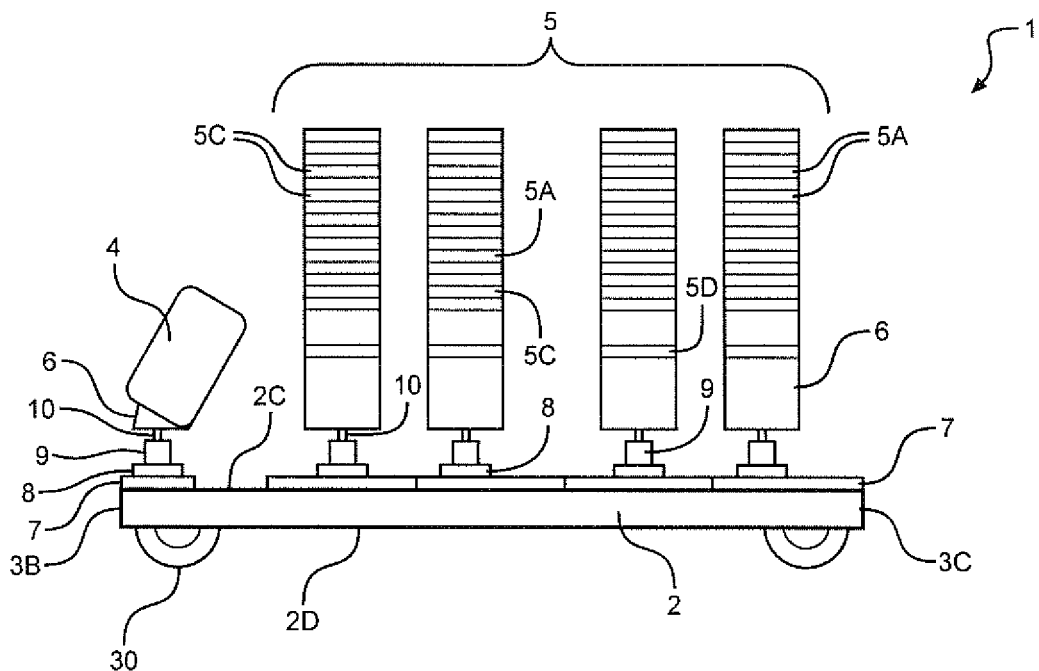
FIG. 6 is a front view of a right hand component showing an alternate spacing of the finger panels.
Figure 7:
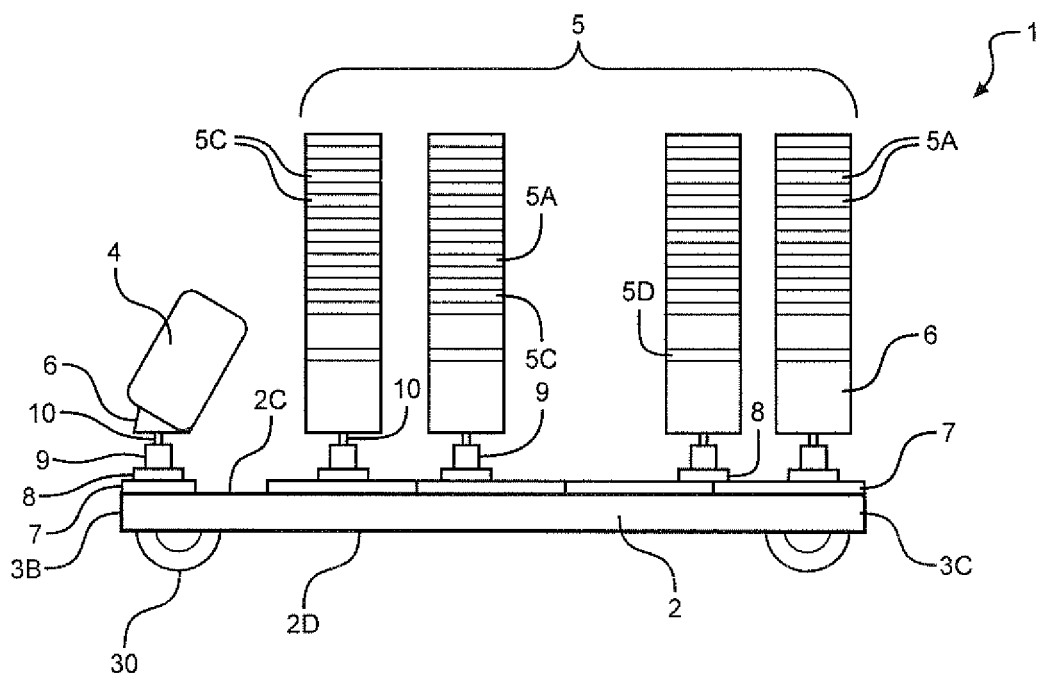
FIG. 7 is a front view of a right hand component showing another alternate spacing of the finger panels.
Figure 6A:
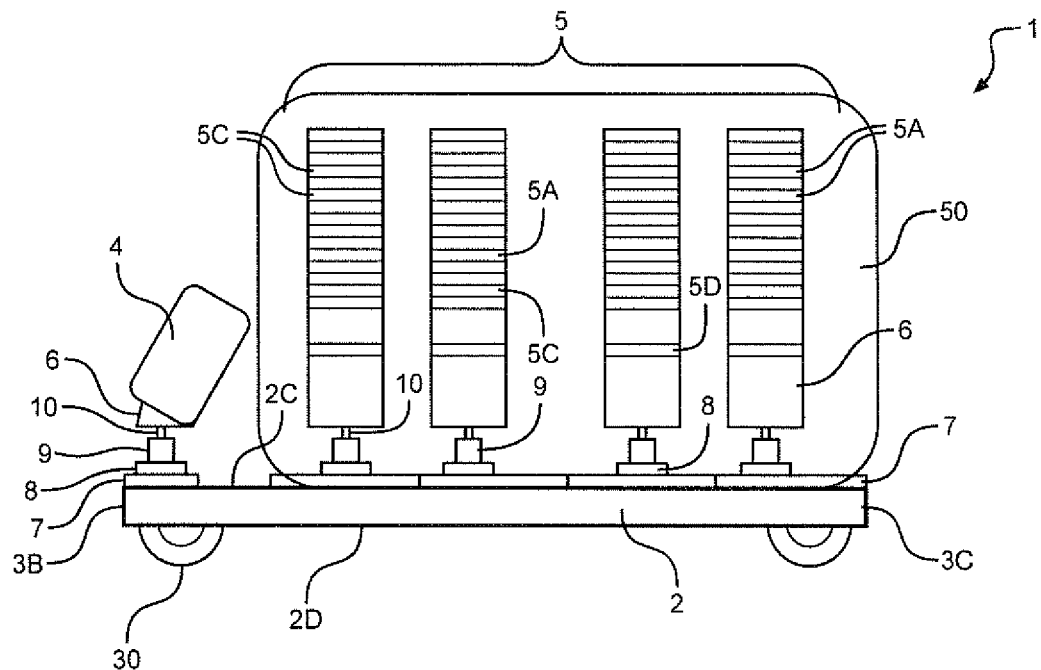
FIG. 6A is a front view of a right hand component having a display means showing the alternate spacing of the finger panels depicted in FIG. 6.
Figure 7A:
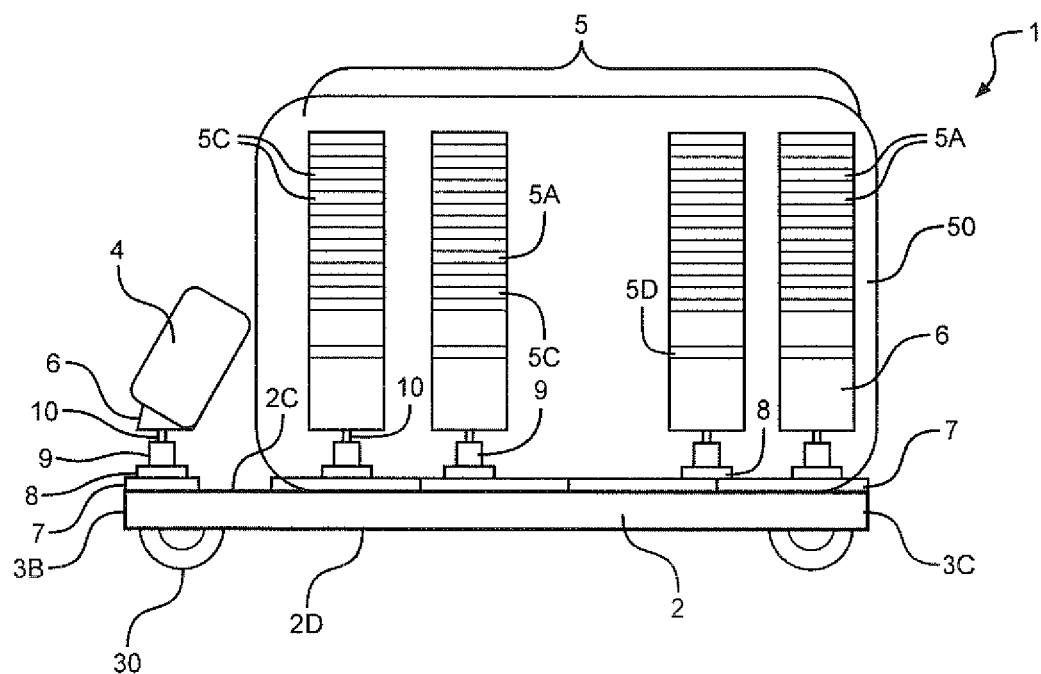
FIG. 7A is a front view of a right hand component having a display means showing the alternate spacing of the finger panels depicted in FIG. 7.
Figure 8:
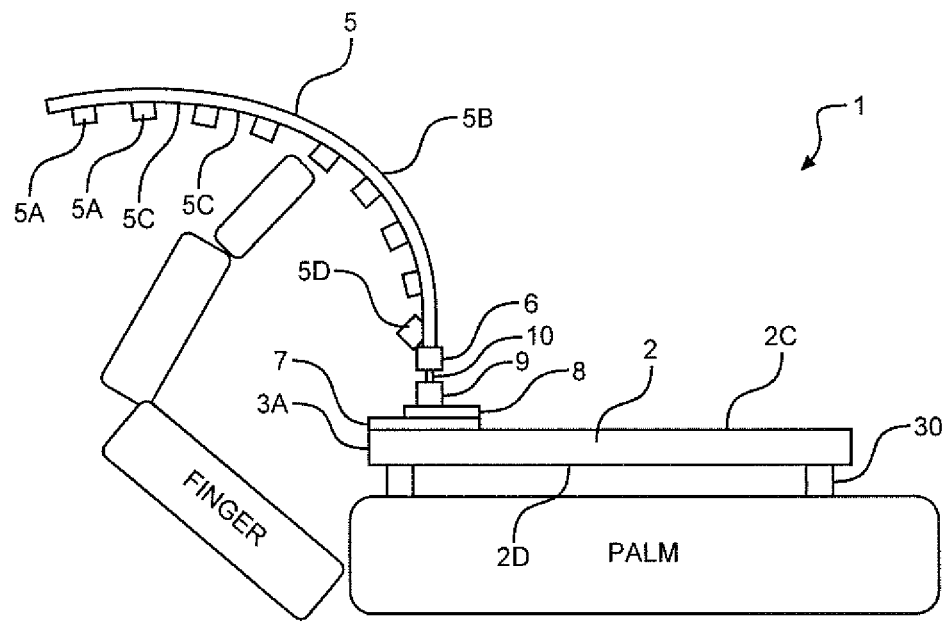
FIG. 8 is a side view of a component showing an ability of a finger panel to move toward a finger when the component is held in a user's hand.
Figure 9:
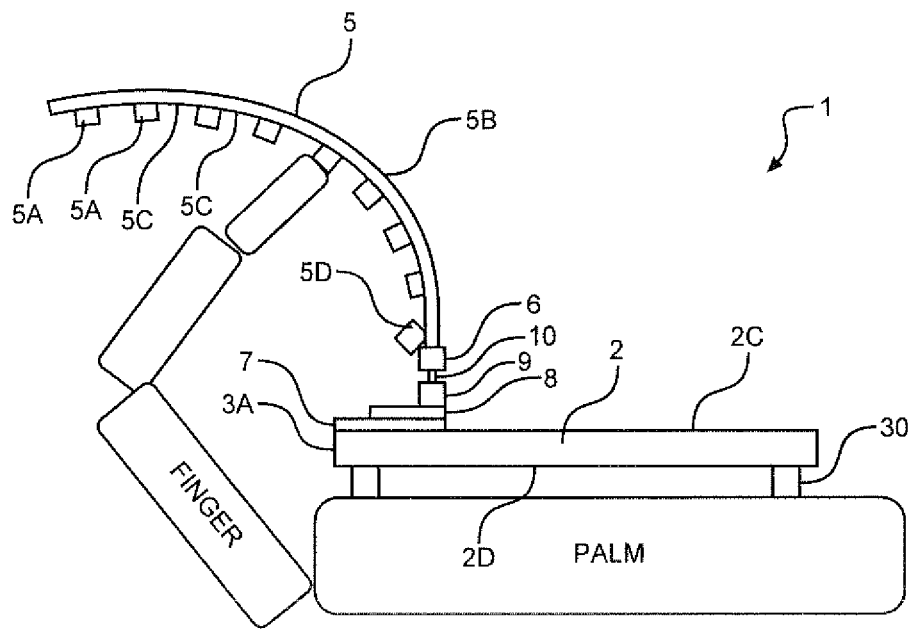
FIG. 9 is a side view of a component showing an ability of a finger panel to move away from a finger when the component is held in a user's hand.
Figure 8A:
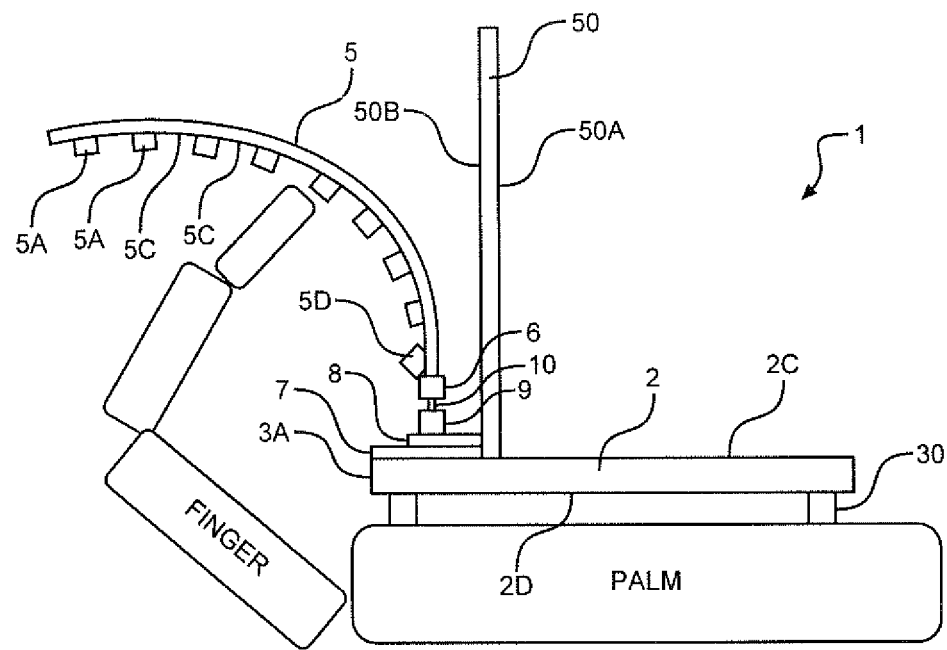
FIG. 8A is a side view of a component having a display means showing an ability of a finger panel to move toward a finger when the component is held in a user's hand.
Figure 9A:
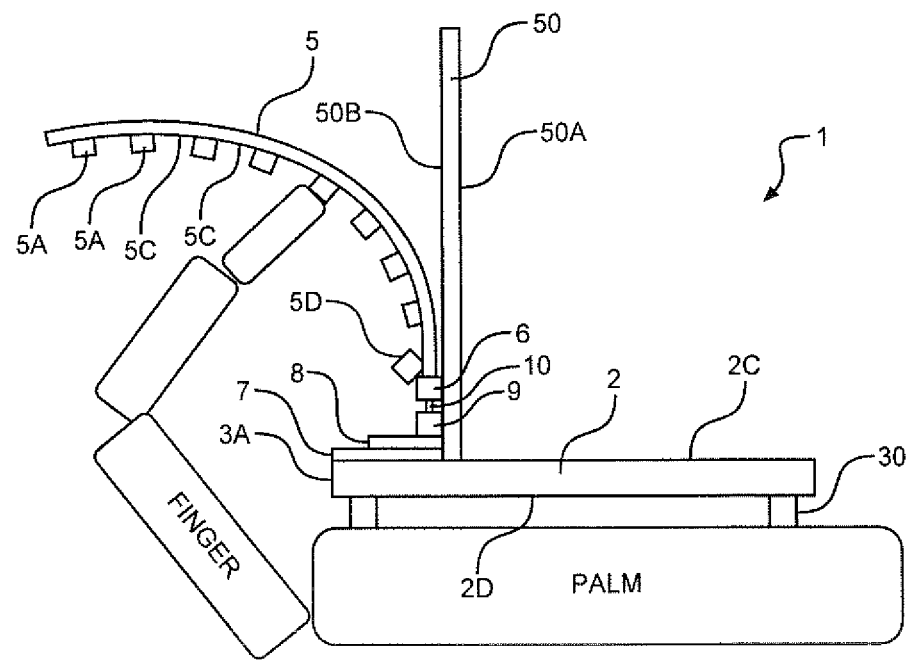
FIG. 9A is a side view of a component having a display means showing an ability of a finger panel to move away from a finger when the component is held in a user's hand.

The thumb panel 4 and the finger panels 5 are adjustably mounted to the base 2 of each component 1 and are preferably attached to the base 2 via a movable mounting assembly involving toothed subassemblies and pedestals secured to pins. However, the thumb panel 4 and the finger panels 5 can be mounted to each component 1 by any suitable means that provides security, flexibility, and adjustability. The thumb panel 4 and each of the finger panels 5 includes a pedestal 6 on a lower end thereof to secure the thumb panel 4 and fingers panels 5 to the base 2 via a mounting assembly shown in FIG. 5. Each pedestal 6 is preferably sufficiently hollow to enclose the electrical components for transmitting user's hand motions to electronic signals. These electrical components are connected to other electrical components housed in the material portion 2a of the base 2, and the electrical components in the base 2 can transmit the signals to a computing device via wires, such as via a USB port, or wirelessly, such as via Bluetooth® technology.

A first assembly 7 is secured to the base 2 and covers substantially all of the rectangular area 3 of the base 2. The first assembly 7 includes a plurality of teeth, which correspond to the teeth of a plurality of gears making up a second assembly 8, so that the second assembly 8 can move relative to the first assembly 7. Unlike the first assembly 7, which covers a substantial part of the base 2, the second assembly 8 comprises a gear for each finger panel 5 and thumb panel 4.

A stand 9 is mounted atop the gears of the second assembly 8 for each of the finger panels 5 and thumb panel 4. The stand 9 includes a lower base portion 9a and an upper portion 9b having an opening therein. Each of the lower base portion 9a and the upper portion 9b have teeth. The teeth of the lower base portion 9a correspond with the teeth of the gears of the second assembly 8 when the stand 9 is attached to the second assembly 8 so that the stand 9 can move relative to the second assembly 8.

A pin 10 having a head portion 10a and a shaft portion 10b is attached to the stand 9 so that the shaft portion 10b is received within the upper portion 9b of the stand 9. The shaft portion 10b of the pin 10 includes a plurality of teeth so that when the pin 10 is received in the upper portion 9b of the stand 9, the teeth of the shaft portion 10b of the pin 10 correspond to the teeth of the upper portion 9b of the stand 9 so that pin can move relative to the stand 9 to adjust the height of thumb panel 4 or finger panel 5.

To attach each of the thumb panel 4 and the finger panels 5 to the base 2 via the mounting assembly, the pedestal 6 of each of the thumb panel 4 and the finger panels 5 is placed onto the pin 10. Specifically, the pin 10 is received in a v-shaped cross-section of the pedestal 6 so that the pedestal 6 and the finger panel 5 can rotatably move about the pin 10. Since the pedestal 6 can move relative to the pin 10, a latch 11 secures the pin 10 in place within the v-shaped cross-section of the pedestal 6 to lock each of the thumb panel 4 and finger panels 5 in position relative to the pin 10.

In light of the preferred mounting assembly of finger panels 5 to base portion 2 of each of the left hand and right hand components 1, the thumb panel 4 and finger panels 5 are completely adjustable. The spacing of the thumb panel 4 and finger panels 5 can be adjusted along the longitudinal axis L of the component 1, as shown in FIGS. 6, 6A, 7 and 7A, to accommodate the shape and size of a user's fingers. To adjust the spacing of the thumb panel 4 and finger panels 5, a user moves the gear of the second assembly 8 for each of the thumb panel 4 and finger panels 5 along the first assembly 7 via the corresponding teeth of the first assembly 7 and the second assembly 8. As a result, by moving the gears of the second assembly 8, a user can move the thumb panel 4 and finger panels 5 closer or farther apart and then lock each of the panels 4 and 5 in a desired location.

In addition to adjusting the spacing of the thumb panel 4 and finger panels 5 by moving the thumb panel 4 and finger panels 5, along the longitudinal axis L of the component 1, a user may also position the thumb and finger panels 4 and 5 closer or further from the thumb and fingers, respectively, by moving the panels 5 in a direction generally perpendicular from the longitudinal axis L, as shown in FIGS. 8, 8A, 9 and 9A. To adjust the distance between the thumb and finger panels 4 and 5 and the user's thumb and fingers, respectively, a user moves the base portion 9a of the stand 9 along the gear of the second assembly 8 for each of panels 4 and 5 via the corresponding teeth of the base portion 9a and the gear of the second assembly 8. As a result, a user can adjust the distance between each of the thumb and finger panels 4 and 5 and the user's thumb and fingers and lock each of the panels 4 and 5 in a desired location.

Figure 10:
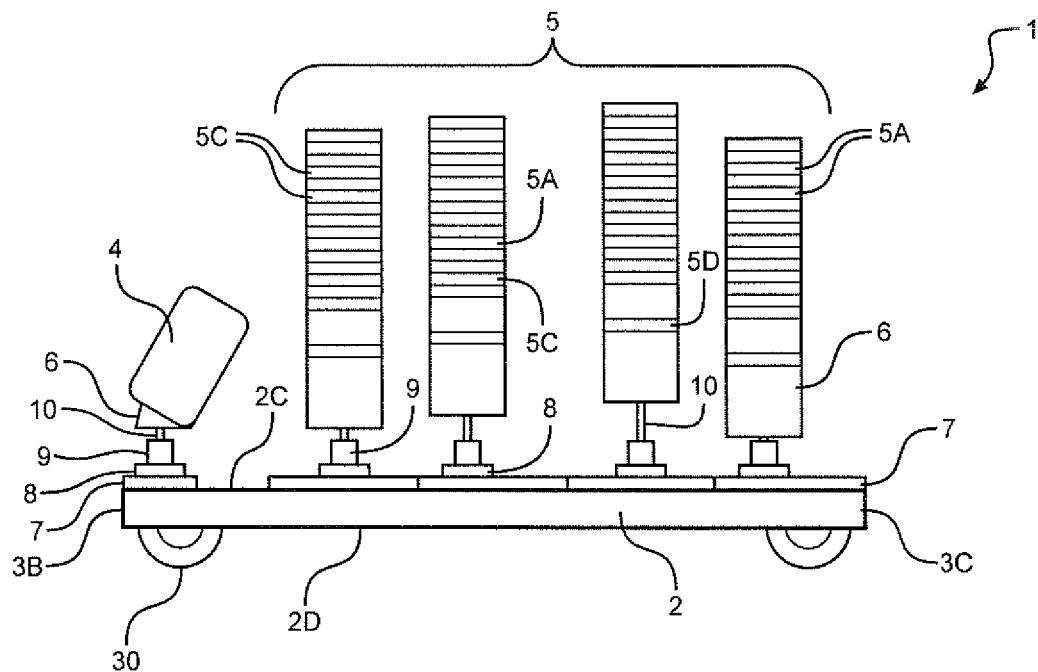
FIG. 10 is a front view of a right hand component showing an ability of the finger panels to move up or down.
Figure 10A:
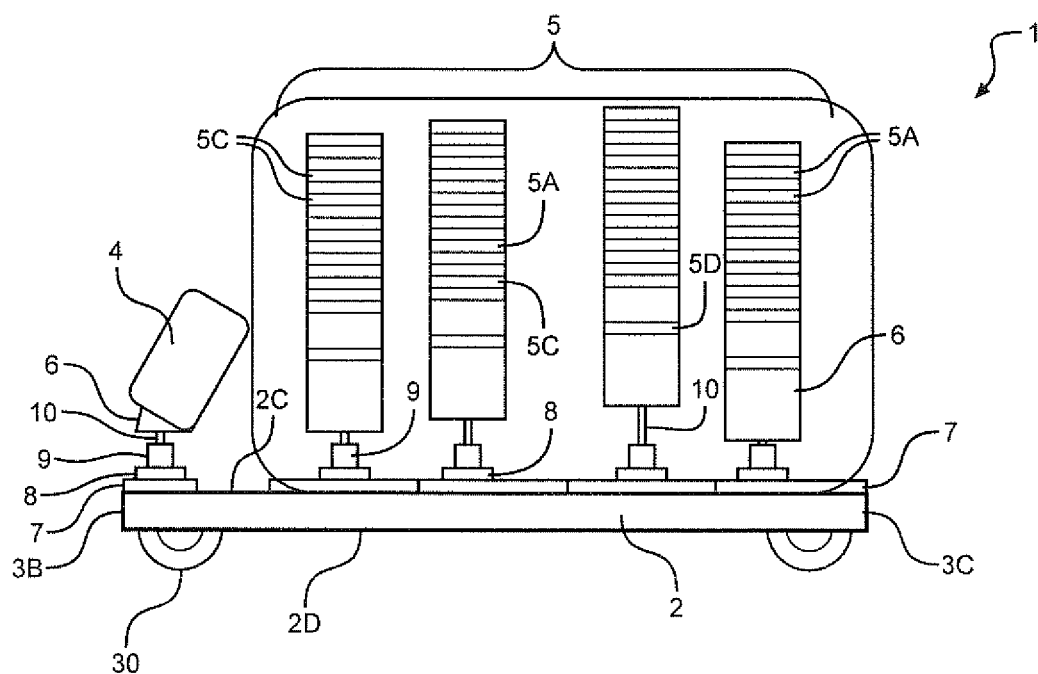
FIG. 10A is a front view of a right hand component having a display means showing an ability of the finger panels to move up or down.

Further, a user can adjust the height of each of the thumb panel 4 and finger panels 5. To adjust the height, a user releases a locking means and moves shaft portion 10b of the pin 10 within the upper portion 9b of the stand 9 via the corresponding teeth of the upper portion 9b and the shaft portion 10b, as shown in FIGS. 10 and 10A. To secure the pin 10 at the desired height, a user secures the shaft portion 10b of the pin 10 to the upper portion 9b of the stand 9 via the locking means.

Figure 11:
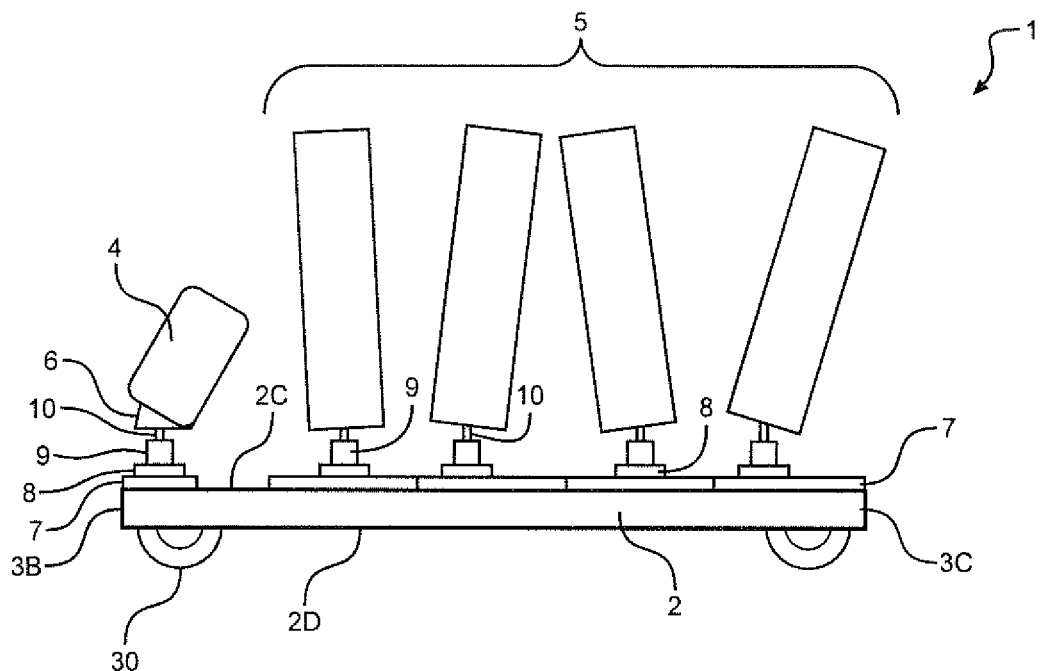
FIG. 11 is a front view of a right hand component showing an ability of the finger panels to independently tilt side-to-side.
Figure 11A:
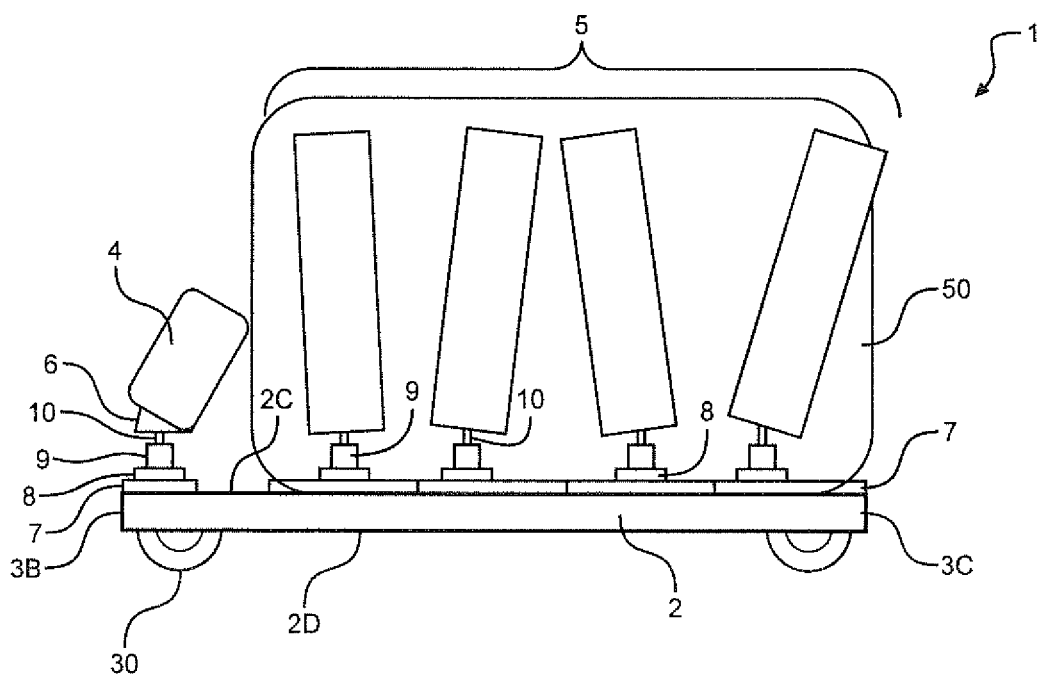
FIG. 11A is a front view of a right hand component having a display means showing an ability of the finger panels to independently tilt side-to-side.

A user can also adjust the tilt of each of the thumb panel 4 and finger panels 5, as shown in FIGS. 11, 11A, 12, 12A, 13, and 13A. To tilt each of the thumb and finger panels 4 and 5, respectively, along the longitudinal axis L of the component 1, a user tilts the each of the panels 4 and 5 so that the v-shaped cross-section of the pedestal 6 pivots about the head portion 10a of the pin 10. Once the desired tilt is reached, the user then attaches the latch 11 to fix the pedestal 6 in place relative to the head portion 10a of the pin 10. As a result, the user can tilt the thumb and finger panels 4 and 5, respectively, side-by-side to move the thumb and finger panels 4 and 5 closer or farther apart, as shown in FIGS. 11 and 11A.

Figure 12:
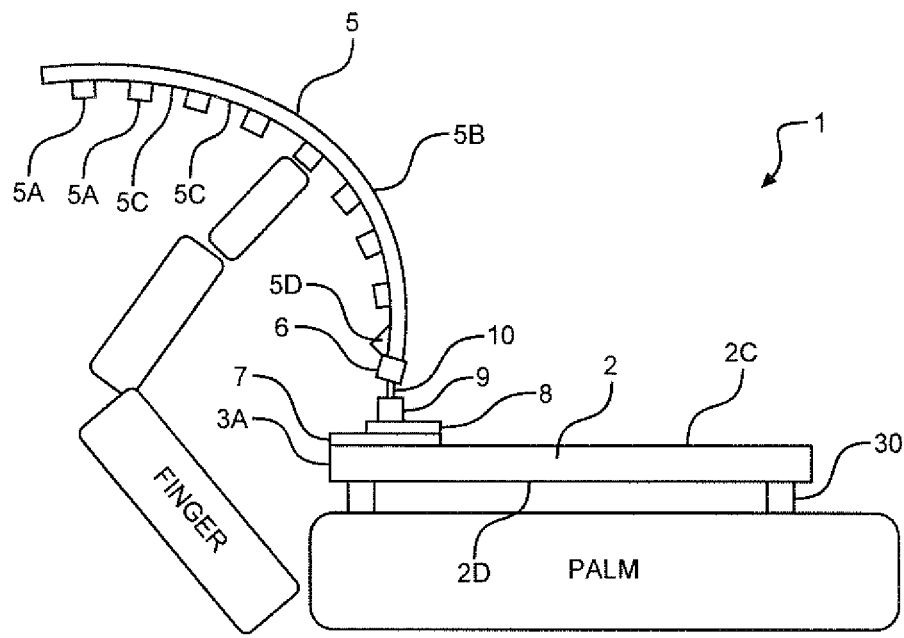
FIG. 12 is a side view of a component showing an ability of a finger panel to tilt backward.
Figure 13:
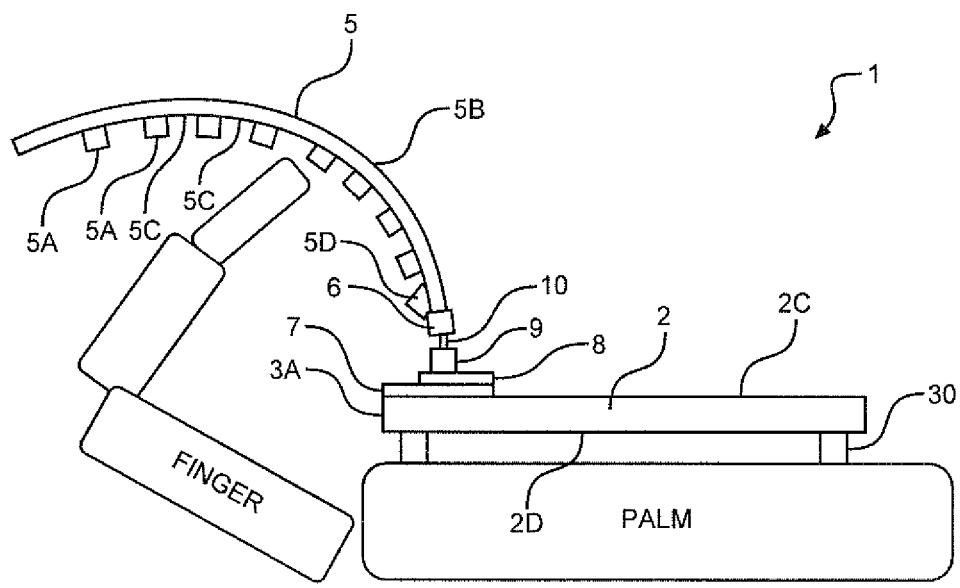
FIG. 13 is a side view of a component showing an ability of a finger panel to tilt forward.
Figure 12A:
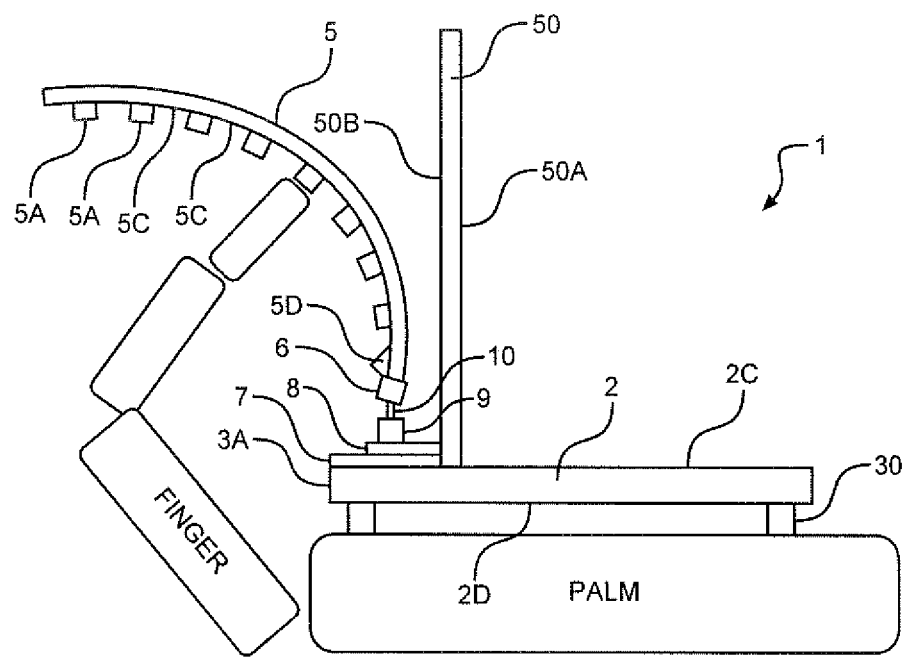
FIG. 12A is a side view of a component having a display means showing an ability of a finger panel to tilt backward.
Figure 13A:
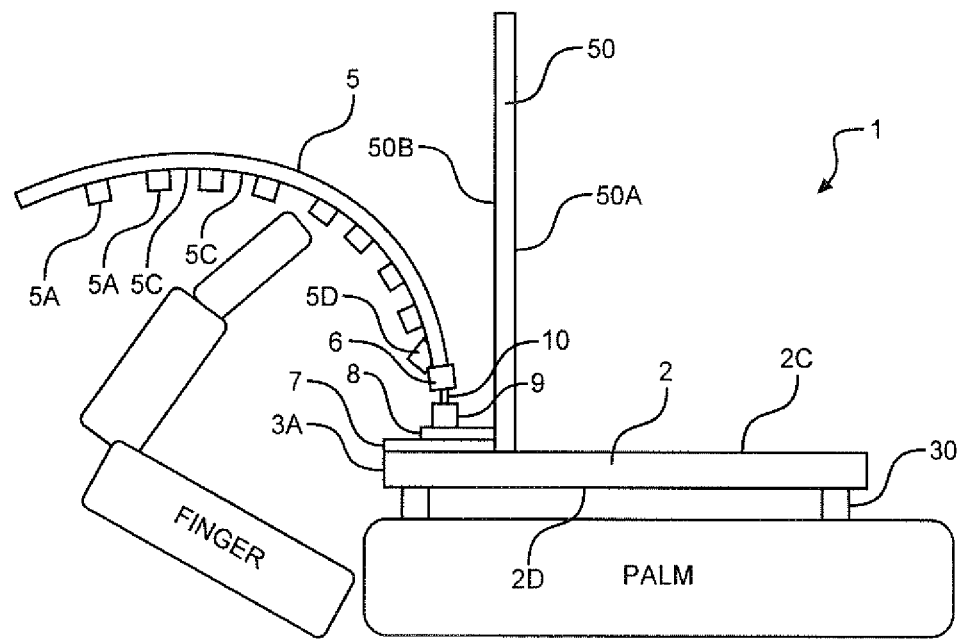
FIG. 13A is a side view of a component having a display means showing an ability of a finger panel to tilt forward.

Similarly, a user can tilt each of the thumb and finger panels 4 and 5 in a direction generally perpendicular to the longitudinal axis L by pivoting the pedestal 6 about the head portion 10a of the pin 10. Once the desired tilt is reached, the user attaches the latch 11 to fix the pedestal 6 in place relative to the head portion 10a of the pin 10. As a result, the user can tilt the thumb and finger panels 4 and 5, respectively, backward away from the user's thumb and fingers, as shown in FIGS. 12 and 12A and forward toward the user's thumb and fingers, as shown in FIGS. 13 and 13A.

Figure 14:
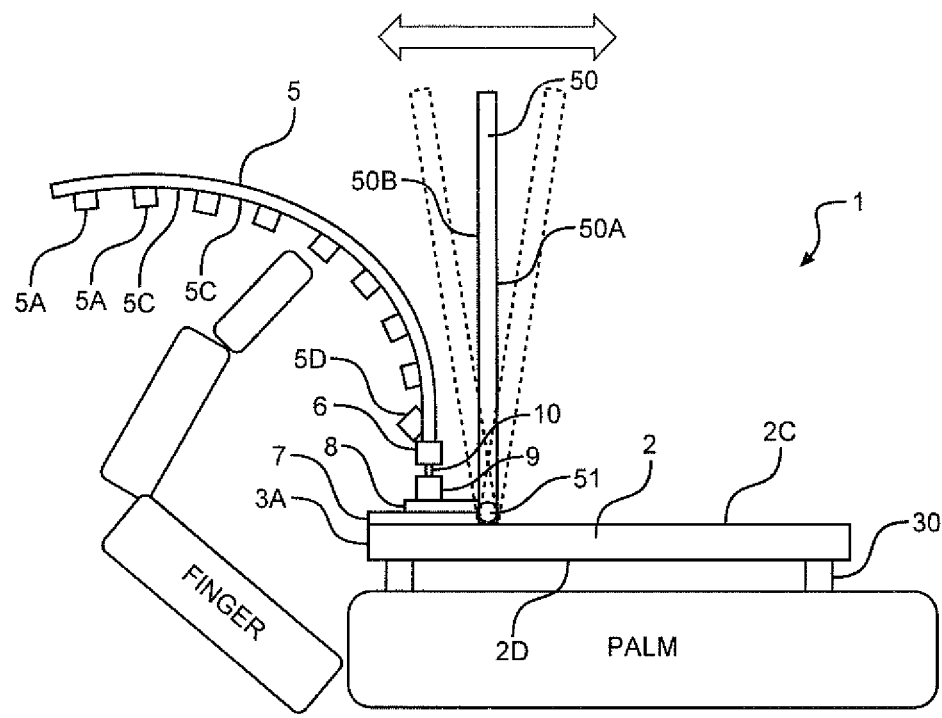
FIG. 14 is side view of a component having a display means showing an ability of the display means to move toward and away from the finger panels.
Figure 15:
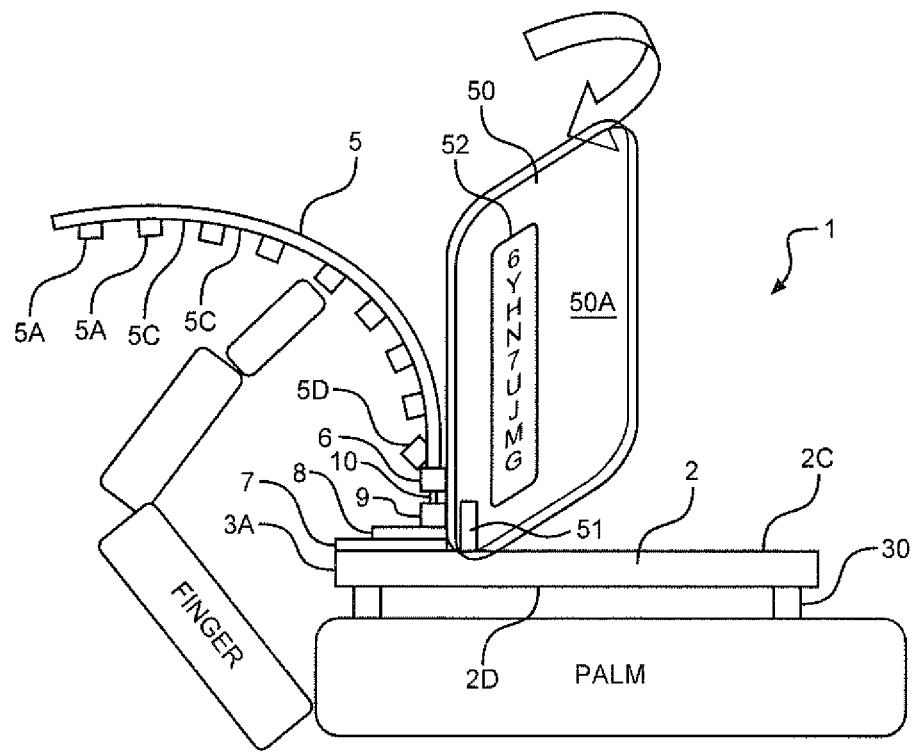
FIG. 15 is a side view of a component having a display means showing an ability of the display means to rotate.

As set forth above, at least one of the left and right hand components 1 may include a display means 50. Like the thumb panel 4 and finger panels 5, the display means 50 is adjustable. In a preferred embodiment, the display means 50 is pivotally connected to the upper surface 2c of the base 2. The display means is secured at a pivot point 51, which is located near a user's index finger adjacent the side 3b or near a user's pinky finger adjacent the side 3c. As a result of this pivoting connection, the display means 50 may be tilted toward or away from the finger panels 5, as shown in FIG. 14, rotated, as illustrated in FIG. 15, and pivoted relative to the upper surface 2c, as shown in FIG. 16.

As also set forth above, the display means 50 includes a front surface 50a for displaying information and an opposing rear surface 50b. The display means 50 can display various information to the user, such as the characters associated with each key on the thumb panel 4 and finger panels 5 or the information inputted by the user via the keys 4f of the thumb panel 4 and the keys 5a of the finger panels 5. For example, as shown in FIG. 16, if the display means 50 is used to display the characters associated with the keys 5a of the finger panels 5, the front surface 50a of the display means 50 is arranged in a plurality of columns 52, wherein each column 52 corresponds to the finger panel 5 located directly behind the column 52. Each column 52 is divided into a plurality of labels 52a, and each label 52a indicates the character or characters associated with the corresponding key 5a on the respective finger panel 5 to enable a user to easily find a desired key.

In addition, the display means 50 may include the functions of a handheld device, such as an iPhone® or Blackberry®, namely displaying websites and other computer applications. The display means 50 can also function as a phone. Further, the display means 50 can act as a gaming console and transmit movements of a user's hands, fingers, and thumbs to a computing device. Like the electrical components for the finger panels 5 and the thumb panel 4, the electrical components for the display means 50 are housed in the material portion 2a of the base 2 and may be connected to the electrical components for the finger panels 5 and thumb panel 4. Further, the electrical components in the base 2 can transmit the signals to a computing device via wires, such as via a USB port, or wirelessly, such as via Bluetooth® technology.

Figure 17:
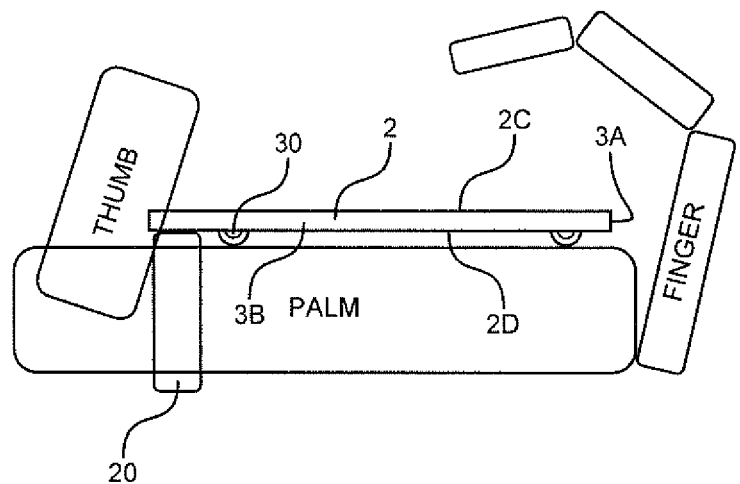
FIG. 17 is a side view of a right hand component secured to a user's hand via a palm clip.
Figure 18:
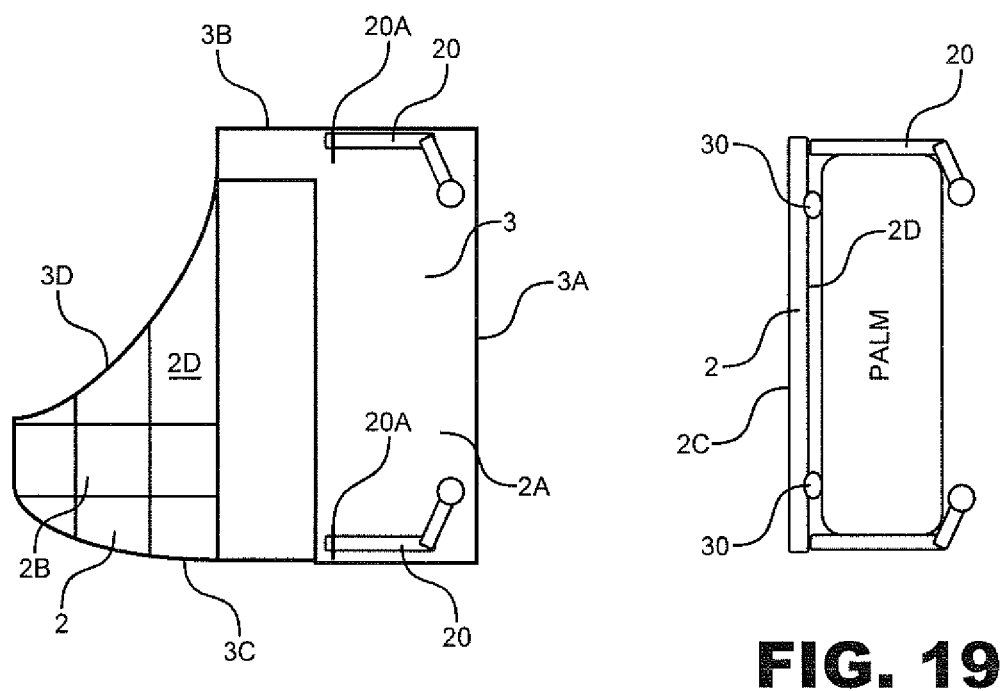
FIG. 18 is a bottom view showing an underside of a base portion of a component.
Figure 19:
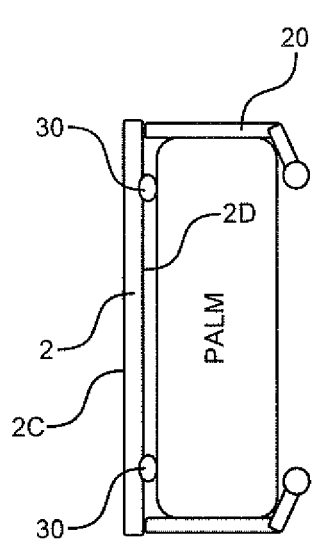
FIG. 19 is a side view showing a component secured to a user's hand via a palm clip.

In addition the adjustable thumb panel 4 and finger panels 5, each component 1 has means for securing the component 1 to a user's hand. As shown in FIGS. 17, 18, and 19, the component 1 includes a palm clip 20. The palm clip 20 comprises two generally L-shaped components which are designed to fit around a user's palm. Each of the pieces of the palm clip 20 is stored in a groove on the bottom surface 2d of the base 2 and is moveably mounted to the bottom surface 2d at a swivel point 20a, as shown in FIG. 18. In addition, each component 1 includes at least one spacer 30 on the bottom surface 2d of the base 2. The spacer 30 creates a gap between the component 1 and a user's palm to provide additional ventilation and comfort.

To attach the left hand and right hand components 1 to a user's hands, the user releases the palm clip 20 from the grooves on the bottom surface 2d of the base 2 by pivoting pieces of the palm clip 20 about the swivel points 20a. Once the palm clip 20 is deployed from the storage groove, the user grasps the base 2 of a component 1 so that the bottom surface 2d of the base 2 rests on the palm and the first edge 3a of the rectangular area 3 is positioned at the base of the fingers. The user then places the user's thumb in the thumb panel 4 and the user's fingers against the finger panels 5. To fasten the component 1 to the hand, the user places the palm clip 20 around the palm.

After the user secures the left hand component 1 to the user's left hand and the right hand component 1 to the right hand, the user can use his or her thumbs and fingers to use the keys 4f and 5a to input data into an electronic device. In a preferred embodiment, the thumb panel 4 is designed to function as a mouse, and the finger panels 5 are designed to act as a keyboard. However, any configuration of keys on the thumb and finger panels 4 and 5, respectively, may be used.

Figure 20:
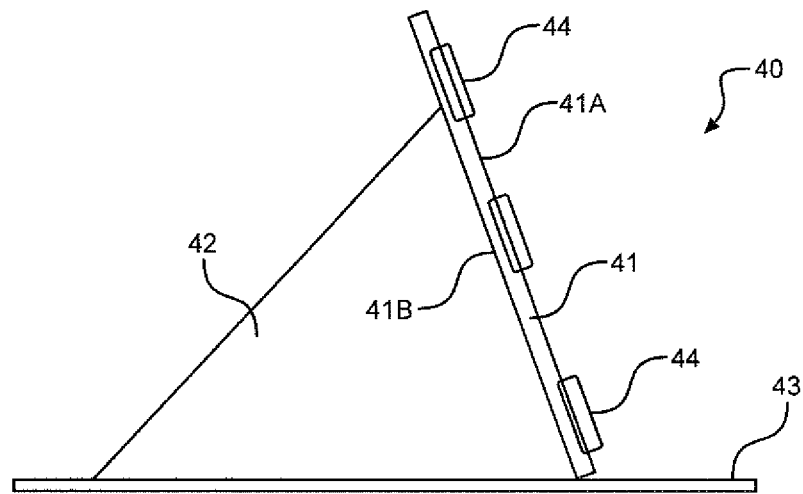
FIG. 20 is a side view showing a stand for each component.
Figure 21:
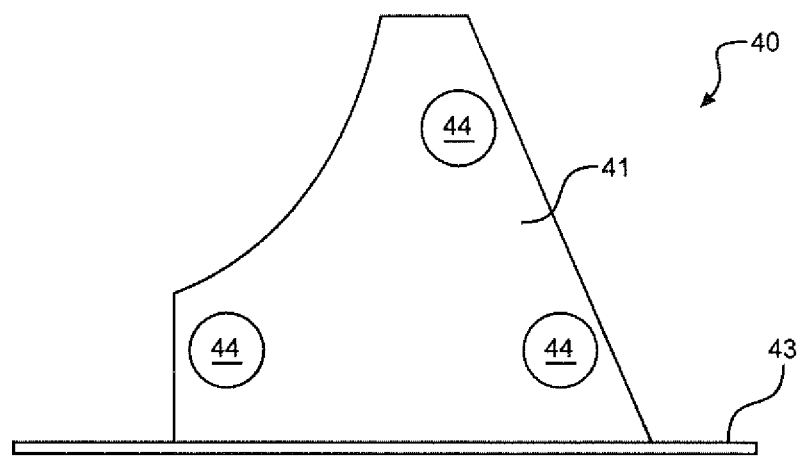
FIG. 21 is a font view of the stand.
Figure 22:
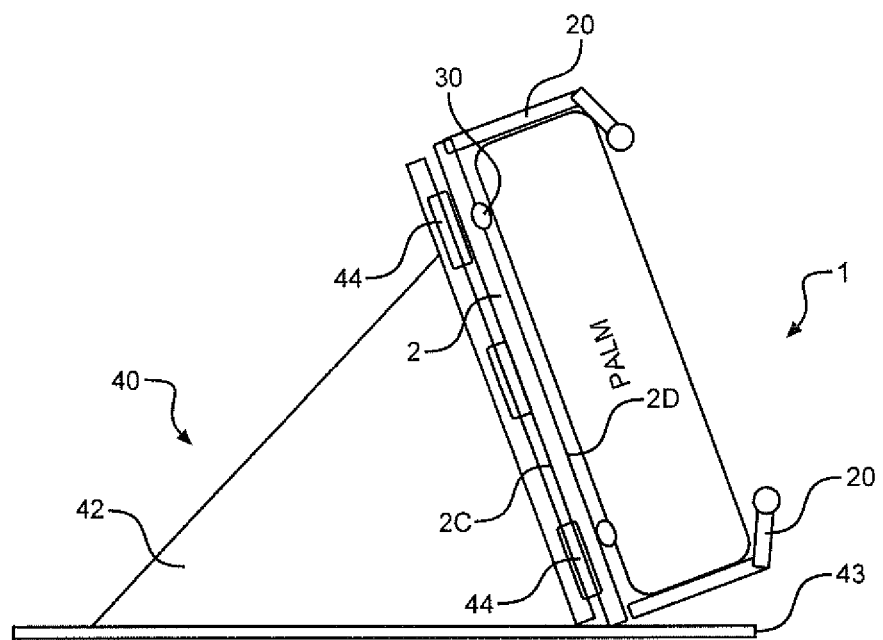
FIG. 22 is side view of the stand with a handheld component resting thereon.

In addition to the left and right hand components 1, the present invention also includes a stand 40 for supporting each of the components 1 when a component 1 is not being utilized. As shown in FIGS. 20, 21, and 22, the stand 40 comprises a receiver plate 41 having an upper surface 41a and a lower surface 41b and a support 42 attached to the lower surface 41b of the receiver plate 41. The stand 40 also has a base 43 secured to the receiver plate 41 and support 42, and the base extends longitudinally so that the stand 40 can be placed on any flat surface.

The receiver plate 41 is preferably made of a magnetic material, which is attracted to the magnetic material of the base portion 2 of each of the components 1. Alternatively, the receiver plate 41 includes at least one magnet 44 located on the upper surface 41a. When a handheld component 1 is not in use, each of the component 1 rests on the stand 40 so that the magnetic base portion 2 of the component 1 contacts the magnetic upper surface 41a of the stand 40. Further, in this position, a user easily secures each component 1 to his or her hand by placing the palm clip 20 around his or her palm while the component 1 is magnetically secured to the stand 40. After the component 1 is secured to the palm, the user can lift the component 1 from the stand 40 and use each handheld component 1 as an ergonomic keyboard and mouse.

The foregoing description of the present invention has been presented to illustrate the principles of the invention and not to limit the invention to the particular embodiments illustrated. It is intended that the scope of the invention be defined by all of the embodiments encompassed within the following claims and their equivalents.

I claim:

1. A handheld data input system for inputting data to an electronic device, comprising:
    a first component adapted to fit a user's first hand, said first component including a first base portion adapted to be received in a palm portion of a user's first hand;
    a plurality of curved finger panels, each of the plurality of curved finger panels including an elongated curved panel having a continuous length with a first end attached to the first base portion, a second end spaced from the first base portion, which bends away from a user's wrist to form an arc, and at least one key positioned on an inner surface of the arc, wherein the plurality of curved finger panels are fixed in position adjacent but spaced from a user's fingers when in use, such that only fingertips of a user's fingers engage the inner surfaces of the arcs when in use; and a thumb portion adapted to fit a user's thumb and extending from the first base portion in a generally perpendicular direction relative to the longitudinal axis of said first base portion, said thumb portion including at least one key, wherein said thumb portion is fixed in position when in use.

2. The handheld data input system of claim 1, further comprising:
- a second component adapted to fit a second hand of a user, said second component including a second base portion adapted to be received in a palm portion of a user's second hand;
- a plurality of curved finger panels, each of the plurality of curved finger panels including an elongated curved panel having a continuous length with a first end attached to the second base portion, a second end spaced from the second base portion, which bends away from a user's wrist to form an arc, and at least one key positioned on an inner surface of the arc, wherein the plurality of curved finger panels are fixed in a position adjacent but spaced from a user's fingers when in use, such that only the fingertips of a user's fingers engage the inner surfaces of the arcs when in use; and
- a thumb portion adapted to fit a user's thumb and extending from the second base portion in a generally perpendicular direction relative to the longitudinal axis of said second base portion, said thumb portion including at least one key, wherein said thumb portion is fixed in position when in use.

3. The handheld data input system of claim 1, wherein first component further includes means for displaying information.

4. The handheld data input system of claim 3, wherein said means for displaying information is mounted to said first base portion such that the means for displaying information can tilt and rotate with respect to said first base portion.

5. The handheld data input system of claim 1, wherein at least part of said first base portion provides ventilation.

6. The handheld data input system of claim 1, further comprising a stand adapted to support said first component, wherein said first component is removably held by the stand.

7. The handheld data input system of claim 6, wherein said first base portion has a magnetic portion including a magnetic material and wherein said stand includes a stand base and a receiving surface for receiving at least the magnetic portion of said first base, said magnetic portion being attracted to at least a portion of said receiving surface to removably hold the first component on the stand.

8. The handheld data input system of claim 1, wherein said at least one component further includes securing structure for securing said first base portion to a user's hand.

9. The handheld data input system of claim 1, further comprising wherein the at least one key is in the form of a depressible key.

10. The handheld data input system of claim 1, wherein said plurality of curved finger panels and said thumb portion are each adjustably mounted to said first base portion of said first component via an adjustable mounting assembly, said adjustable mounting assembling including a first assembly attached to said first base portion of said first component and having a plurality of teeth, a second assembly attached to said first assembly and having a gear for each of said plurality of curved finger panels and said thumb portion, each gear including a plurality of teeth that correspond to said plurality of teeth of said first assembly so that said second assembly can move relative to said first assembly, a stand mounted to each gear of said second assembly and having an upper portion and a lower portion, said lower portion of said stand having a plurality of teeth that correspond to said plurality of teeth of each gear of said second assembly so that said stand can move relative to said second assembly, a pin having a shaft portion and a head portion, said shaft portion of said pin being received within said upper portion of said stand, and a pedestal attached to each of said plurality of curved finger panels and thumb portion, said pedestal being pivotally mounted to said head portion of said pin so that the tilt of each of said plurality of curved finger panels and thumb portion can be locked into one of a number of different positions relative to the first base portion.

11. The handheld data input system of claim 10, wherein said upper portion of said stand includes a plurality of teeth and wherein said shaft portion of said pin includes a plurality of teeth that correspond to said plurality teeth of said upper portion of said stand so that said pin can move relative to said stand to adjust the height of each of said plurality of curved finger panels and said thumb portion.

12. The handheld data input system of claim 11, wherein said adjustable mounting system further includes a latch for locking said pedestal of each of said plurality of curved finger panels and thumb portion in place relative to said head portion of said pin.

13. The handheld data input system of claim 1, wherein said at least one component further includes at least one spacer mounted to an underside of said first base portion to create a gap between a user's palm and the underside of said first base portion.

14. The handheld data input system of claim 1, wherein said first component includes means for wirelessly transmitting data to the electronic device.

15. The handheld data input system of claim 1, wherein said at least one component includes means for connecting to the electronic device.

16. The handheld data input system of claim 1, wherein said first base portion includes a curved edge portion adapted to generally fit the curvature of the palm of the user such that pressure by the user's fingers on the plurality of curved finger panels pushes the curved edge portion against the palm of the user's hand and provides stability for the input system; wherein the base portion only partially covers the palm.

17. The handheld data input system of claim 1, further comprising a clip for securing said first base portion to a user's hand, said clip having two opposing non-connected and spaced generally L-shaped pieces that are designed to fit around a user's palm.

18. A handheld data input system for inputting data to an electronic device, comprising:
- a first component adapted to fit a user's first hand, said first component including a first base portion adapted to be received in a palm portion of a user's first hand;
- a plurality of curved finger panels, each of the plurality of curved finger panels including a first end attached to the first base portion, a second end spaced from the first base portion, which bends away from a user's wrist to form an arc, and at least one key positioned on an inner surface of the arc, wherein the plurality of curved finger panels are fixed in position adjacent but spaced from a user's fingers when in use, such that only fingertips of a user's fingers engage the inner surfaces of the arcs when in use;

a thumb portion adapted to fit a user's thumb and extending from the first base portion in a generally perpendicular direction relative to the longitudinal axis of said first base portion, said thumb portion including at least one key, wherein said thumb portion is fixed in position when in use; and a clip for securing said first base portion to a user's hand, said clip having two generally L-shaped pieces that are designed to fit around a user's palm, each of said pieces being pivotally mounted about a swivel point to an underside of said first base portion of said first component such that each of the pieces can rotate relative to said first base portion.

19. The handheld data input system of claim 18, wherein the underside of said first base portion includes a groove for storing each of said pieces of said clip.

20. A handheld data input system for inputting data to an electronic device, comprising:

a first component adapted to fit a user's first hand, said first component including a first base portion adapted to be received in a palm portion of a user's first hand;

a plurality of curved finger panels, each of the plurality of curved finger panels including a first end attached to the first base portion, a second end spaced from the first base portion, which bends away from a user's wrist to form an arc, and at least one key positioned on an inner surface of the arc, wherein the plurality of curved finger panels are fixed in position adjacent but spaced from a user's fingers when in use, such that only fingertips of a user's fingers engage the inner surfaces of the arcs when in use;

a thumb portion adapted to fit a user's thumb and extending from the first base portion in a generally perpendicular direction relative to the longitudinal axis of said first base portion, said thumb portion including at least one key, wherein said thumb portion is fixed in position when in use;

wherein said thumb portion further includes a lower wall, an upper wall that is opposite said lower wall and only partially covers said lower wall, a front wall located between said lower and upper walls, and opposing side walls located between said lower and upper walls and on either side of said front wall so that said thumb portion has a generally rectangular box-like shape that is open on more than one side for receiving a user's thumb therein, wherein the box-like shape enables a user to move their thumb within the thumb portion.

\* \* \* \* \*